US011289730B2

(12) United States Patent
Brooks et al.

(10) Patent No.: US 11,289,730 B2
(45) Date of Patent: Mar. 29, 2022

(54) FLEXIBLE BATTERIES (71) Applicant: Vorbeck Materials, Jessup, MD (US)

(72) Inventors: Louise Brooks, Washington, DC (US); John S. Lettow, Washington, DC (US)

( * ) Notice: Subject to any disclaimer, the term of this patent is extended or adjusted under 35 U.S.C. 154(b) by 1231 days.

(21) Appl. No.: 14/433,335

(22) PCT Filed: Oct. 2, 2013

(86) PCT No.: PCT/US2013/063153
§ 371 (c)(1),
(2) Date: Apr. 2, 2015

(87) PCT Pub. No.: WO2014/055711
PCT Pub. Date: Apr. 10, 2014

(65) Prior Publication Data
US 2015/0263377 A1 Sep. 17, 2015

Related U.S. Application Data (60) Provisional application No. 61/709,139, filed on Oct. 2, 2012.

(51) Int. Cl.
*H01M 10/00* (2006.01)
*H01M 10/04* (2006.01)
*H01M 50/529* (2021.01)

(52) U.S. Cl.
CPC ..... *H01M 10/0436* (2013.01); *H01M 50/529* (2021.01); *H01M 2220/30* (2013.01)

(58) Field of Classification Search
CPC .............. Y02E 60/10; H01M 2220/30; H01M 10/0436; H01M 50/529; H01M 10/04
See application file for complete search history.

(56) References Cited

U.S. PATENT DOCUMENTS

| | | | | |
|---|---|---|---|---|
| 2007/0134556 A1* | 6/2007 | Sano | ................... | H01M 10/052 429/247 |
| 2009/0098416 A1* | 4/2009 | Hatta | .................. | H01M 50/543 429/7 |
| 2010/0313329 A1* | 12/2010 | Haynes | ..................... | A41D 1/04 2/102 |
| 2012/0120638 A1* | 5/2012 | Gonzalez | .................. | B68C 1/00 362/154 |
| 2012/0153740 A1* | 6/2012 | Soar | ........................ | H02J 50/12 307/104 |
| 2014/0329126 A1* | 11/2014 | Ho | ........................ | H01M 4/364 429/128 |

* cited by examiner

*Primary Examiner* — Cynthia H Kelly
*Assistant Examiner* — Monique M Wills
(74) *Attorney, Agent, or Firm* — Trentice V. Bolar, Esq.

(57) ABSTRACT

Flexible batteries, comprising at least two cells, wherein at least two cells are connected by flexible connectors, such that the battery can be bent. The batteries can be incorporated into clothing and gear.

18 Claims, 8 Drawing Sheets

FLEXIBLE BATTERIES

REFERENCE TO RELATED APPLICATIONS

The present application claims priority to U.S. Provisional Application No. 61/709,117, filed on Oct. 2, 2012, the entire contents of which is hereby incorporated by reference.

FIELD OF THE INVENTION

The present invention relates to flexible batteries. The batteries can be incorporated into apparel and other gear.

BACKGROUND

With the proliferation of portable electronic devices and other energy-intensive accoutrements, more convenient portable energy storage is becoming increasingly desirable. Traditional batteries can be carried to keep electronic devices charged and power other devices such as heaters, but they can be rigid, bulky, and cumbersome. It would be desirable to obtain batteries that are flexible and can be incorporated into apparel, gear, etc.

SUMMARY OF THE INVENTION

Disclosed and claimed herein is a battery, comprising at least two cells, wherein at least two cells are connected by flexible connectors, such that the battery can be bent. Further disclosed and claimed is an article of clothing comprising a battery, comprising at least two cells, wherein at least two cells are connected by flexible connectors, such that the battery can be bent.

DETAILED DESCRIPTION OF THE INVENTION

Figure 1:
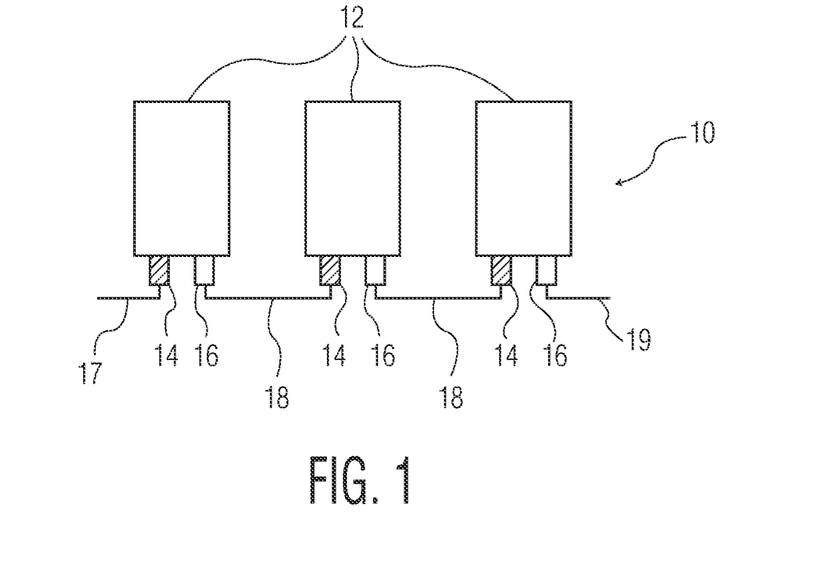
FIG. 1 is a schematic view of a battery of the invention.
Figure 2:
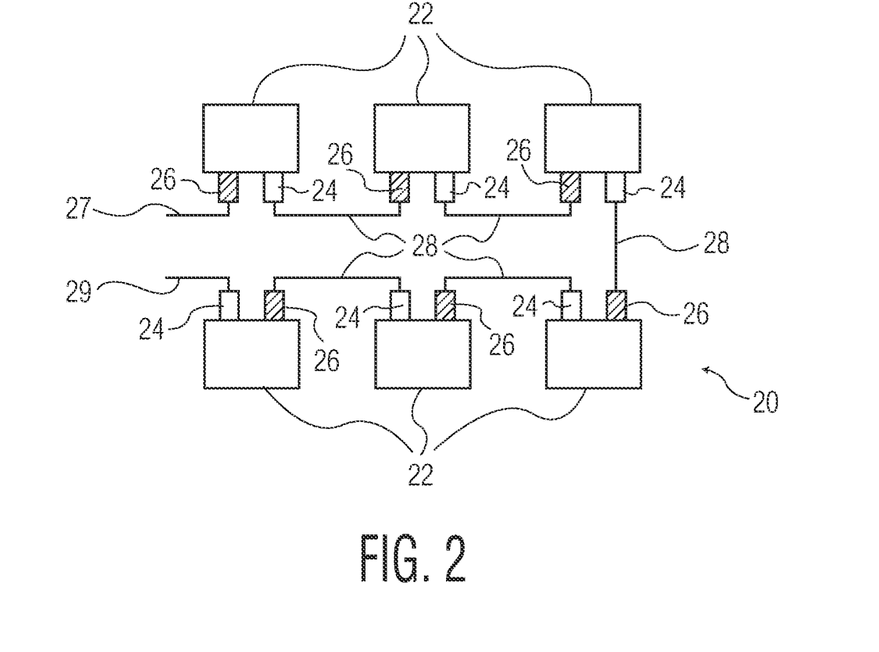
FIG. 2 is a schematic view of a battery of the invention where the cells form a two-dimensional array.

The batteries of the present invention comprise at least two electrochemical cells that are connected by electrical connectors. The batteries can be bent and be made to conform to surfaces, including flat, curved, uneven, and otherwise irregular surfaces. FIG. 1 shows a battery 10 comprising cells 12 having anodes 14 and cathodes 16, wherein the cells are connected in series by flexible connectors 18. The battery has a negative terminal 17 and a positive terminal 19. The battery can comprise a linear arrangement of cells as in FIG. 1 or a two-dimensional array of cells as in FIG. 2 where cells 22 having anodes 26 and cathodes 24 are connected by flexible connectors 28. The battery has a negative terminal 27 and a positive terminal 29. The batteries can comprise a three dimensional arrangement of cells, such as one wherein one- or two-dimensional arrays of cells are stacked while remaining connected by flexible connectors.

The batteries can be connect in series and/or in parallel. In some cases, there will be 2 to about 500 cells, or about 2 to about 300 cells, or about 2 to about 100 cells, or about 2 to about 50 cells, or about 2 to about 25 cells, or about 2 to about 20 cells, or about 5 to about 300 cells, or about 5 to about 100 cells, or about 5 to about 50 cells, or about 5 to about 25 cells, or about 5 to about 10 cells, or about 10 to about 300 cells, or about 10 to about 100 cells, or about 10 to about 50 cells, or about 10 to about 20 cells, or about 20 to about 300 cells, or about 20 to about 100 cells, or about 20 to about 50 cells, or about 50 to about 300 cells, or about 50 t0 about 100 cells in the battery.

In some embodiments, the connectors are sufficiently flexible to allow two adjoining cells to be bent at an angle of at least about 15°, or at least about 25°, or at least about 45°, or at least about 90°, or at least about 135°, or at least about 180° relative to each other.

There are no particular limitations to the types of batteries or cell chemistries that can be used. The batteries can be rechargeable or disposable. They can be wet cells, dry cells, etc. Examples of chemistries for disposable batteries include zinc-carbon, zinc chloride, alkaline, zinc-manganese dioxide, nickel oxyhydroxide, zinc-manganese dioxide/nickel oxyhydroxide, lithium, lithium-copper oxide, lithium-iron disulfide, lithium-managanese dioixde, mercury oxide, zinc-air, silver oxide, silver-zinc, etc.

Examples of chemistries for rechargeable batteries include nickel-cadmium, alkaline, lead-acid, nickel-hydrogen, nickel-metal hydride, nickel-zinc, lithium iron phosphate, lithium titanate, lithium ion, lithium air, lithium ion polymer, lithium sulfur, sodium ion, potassium ion, thin film lithium, zinc-bromine, zinc-cerium, vanadium redox, sodium-sulfur, molten salt, silver oxide, etc.

Examples of cells include pouch cells (cells without a hard outer housing), coin cells, printed cells, etc. The cells can have a thin, flat, rectangular form factor. The cells preferably do not have a rigid case, such as the metallic cases commonly used in typical batteries.

Figure 3:
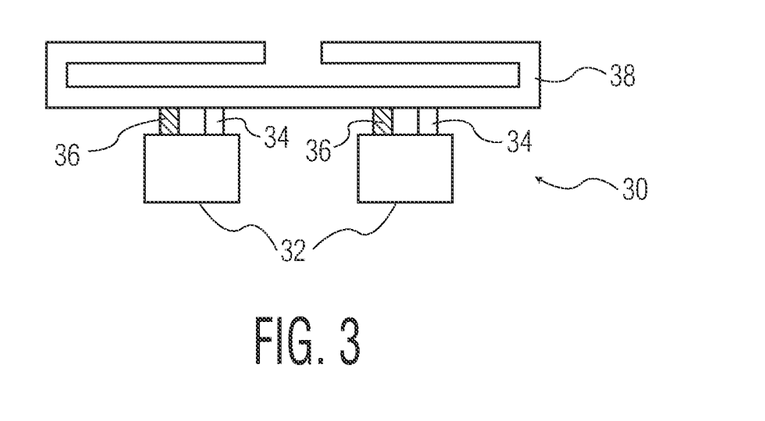
FIG. 3 is a schematic view of a battery of the invention comprising a bus bar.

The flexible connectors can be any suitable type of connector, including wires, metal strips or sheets, printed connectors, bus bars (including printed bus bars), etc. Printed connectors and bus boards can be made by printing a conductive material (such as ink) on a substrate (including paper, cardboard, etc.). FIG. 3 shows a battery assembly 30, having cells 32, which have anodes 36 and cathodes 34 that are connected to a bus bar 38.

Figure 4:
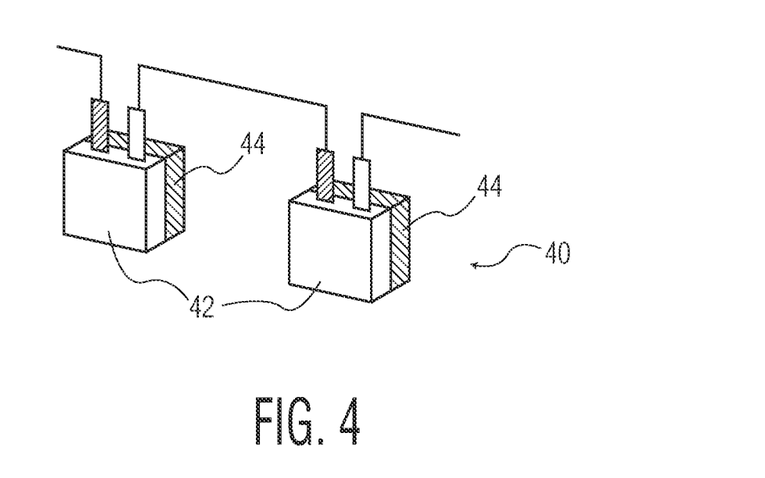
FIG. 4 shows a flexible battery of the invention having a rigid backing material.

In some cases, particularly when the cells are non-rigid (such as pouch cells), a backing material can be applied to at least a portion of the surface of the cells to provide additional rigidity. For example, FIG. 4 shows a battery 40 having cells 42 that have a backing 44. Any suitable material can be used as backing materials, including plastics, paperboards, cardboards, metals, ceramics, foams, tapes, fabrics, non-woven materials, films, sheets, adhesives, meshes, etc. Examples of materials include aramids (such as Kevlar®, Nomex®, etc.), ultra-high-molecular-weight polyethylene (e.g. Dynema®, Spectra®, etc.), PET, etc. In some embodiments it is desirable to use materials that are light weight and/or mechanically robust.

In some cases, the cells can be arranged on a mesh (including adhesive meshes) and attached to the mesh (by adhesive, wiring, screwing, crimping, clamping, stapling, sewing, welding, soldering, etc.). The mesh can be cut into desired sizes. In some cases, the mesh may contain one or more wires or other electrical connectors may be on top of or intertwined with the mesh. The wires or other connectors can be connected (e.g. by clamping, crimping, welding, soldering, etc.) to the cells to serve as the electrical connectors between the cells. The mesh can be thermally conductive.

Backing materials can be chosen to be to thermally dissipative/heating spreading, impact resistant or absorbent, liquid absorbent, chemical resistance (such as to protect the batteries and devices from the environment or to prevent leakage from the cells, etc.).

In some cases the backing materials are thermally conductive. In some cases they can have a thermal conductivity of at least about 0.5 W/m·K, of at least about 0.7 W/m·K, of at least about 1 W/m·K, or at least about 3 W/m·K, or at least about 5 W/m·K, or at least about 10 W/m·K, or at least about 20 W/m·K, or at least about 30 W/m·K.

Figure 10A:
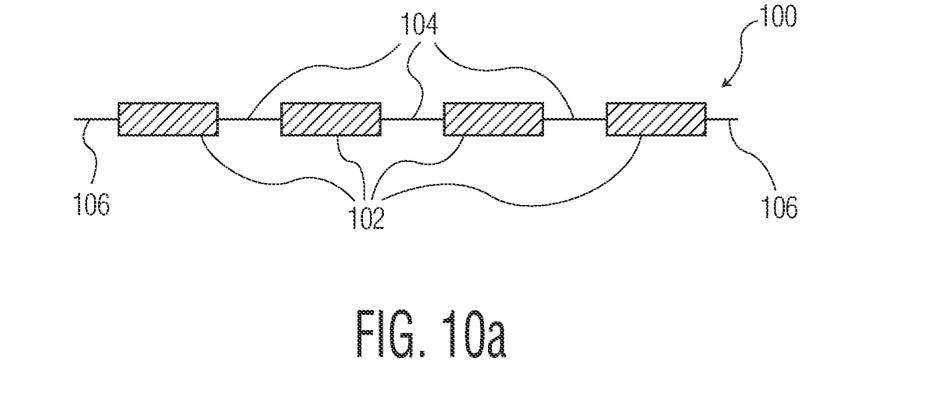
FIG. 10(a) shows a schematic view of a battery where the cells are arranged in a linear fashion.
Figure 10B:
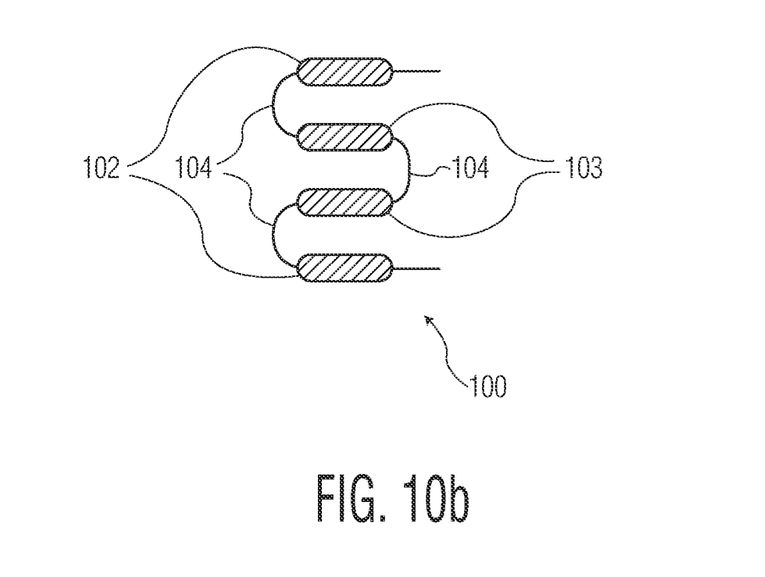
FIG. 10(b) shows a schematic view of a battery where the cells are stacked relative to each other.

In some cases, the batteries can be folded into a compact unit for storage, transport or use. FIG. 10($a$) shows a battery 100 having cells 102, flexible connectors 104, and terminals 106. The battery is extended horizontally for use. FIG. 10($b$) shows battery 100 folded up as flexible connector 104 have curved, allowing cells 102 to stack on each other.

In some embodiments, the cells have a thickness of no more than about 15 mm, or no more than about 12 mm, or no more than about 10 mm, or no more than about 8 mm, or no more than about 6 mm, or no more than about 5 mm, or no more than about 4 mm, or no more than about 2 mm, or no more than about 1 mm, or no more than about 1 mm.

In some embodiments, the total surface to volume ratio of the cells is at least about 3.5:1, or at least about 4:1, or at least about 4.5:1, or at least about 5:1, or at least about 6:1, or at least about 7:1, or at least about 8:1. The flexible structure of the battery can allow the use of several flat cells having high surface to volume ratios, which can allow for more efficient cooling and safer battery operation and can in some cases allow them to be used close to or in contact with a person's skin. This can also permit the formation of thin, broad batteries that allow for the distribution of weight over a greater area. This can be an advantage when carrying the batteries. Higher surface to volume ratios can be advantageous for lithium-air batteries.

In some embodiments, the batteries can have an energy density of about 0.1 W-h to about 1 kW-h, or about 0.1 W-h to about 250 W-h, or about 0.1 W-h to about 100 W-h, or about 1 W-h to about 250 W-h, or about 1 W-h to about 100 W-h, or about 5 W-h to about 250 W-h, or about 5 W-h to about 100 W-h.

In some embodiments, the batteries have an voltage of about 1 to about 20 V, or about 1 to about 15 V, or about 1 to about 10 V, or about 1 to about 5 V, or about 2 to about 20 V, or about 1 to about 42 V, or about 1 to about 24 V, or about 5 to about 15 V, or about 5 to about 20 V, or about 5 to about 24 V, or about 5 to about 42 V.

Figure 5:
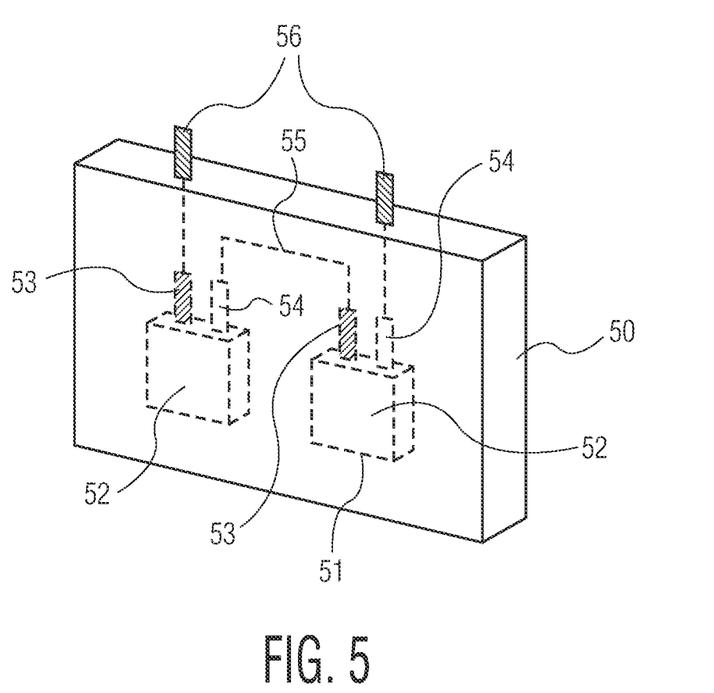
FIG. 5 shows a battery of the invention sealed in a protective pouch.

The batteries may be sealed into a wrapper such as a pouch or casing. For example, FIG. 5 shows a pouch 50 containing a battery 51 having cells 52 that have cathodes 53 and anodes 54, and that are connected by flexible connector 55. Terminals 56 emerge from the sealed pouch. The pouch or casing may be waterproof and the battery may be washable. It may be permanently sealed or openable. Examples of pouch or casing materials include plastics (such as vinyl polymers (e.g., poly(vinyl chloride)), polyethylenes, ultra-high-molecular-weight polyethylenes (e.g. Dynema®, Spectra®, etc.), polypropylenes, polyesters, polyurethanes, heat shrink polymers, PVC, etc.) The batteries may be in an air-permeable wrappers in some cases, such as where lithium-air batteries are used. The batteries may be laminated into a wrapper or onto a backing material.

In some embodiments, films used to form the wrappers can have a thickness of no more than about 3 mils, or no more than about 2 mils, or no more than about 1 mil, or no more than about 0.8 mils. Suitable wrapper materials include, but are not limited to polyethylene, polypropylene, poly(vinyl chloride), etc. The wrappers may have an adhesive or heat sealable layer that can be used to place the battery on a substrate (such as a piece of apparel or other gear) and allows it to adhere easily.

The batteries can be wearable and used to power wearable equipment and devices.

The batteries can be attached to or incorporated into other objects, such as apparel, bags, gear, etc. Examples include straps, shirts, jackets, coats, vests, shirts, pants, shorts, hats, helmets, shoes, boots, belts, gloves and mittens, socks, underwear, sweat shirts and pants, athletic apparel and gear, hand bags, purses, backpacks, briefcases, messenger bags, computer bags, satchels, luggage, sports bags (golf bags, gym bags, etc.), tents, sleeping bags, sleeping pads and mattresses, hunting and sports equipment, ski apparel (such as ski jackets, pants, boots, etc.) chairs, cushions, upholstered objects, seats (such as car or vehicle seats), ballistic protection equipment (e.g. bullet-proof vests), wetsuits, drysuits, scuba diving equipment, space suits, etc. The batteries can be attached to the surface of the objects by any suitable method, such as by crimping, sewing, snaps, buttons, tape, adhesive, hook and loop fasteners (e.g. Velcro®), zippers, etc. They can be pressed, hot pressed, or otherwise affixed using a thermal transfer adhesive. The batteries can be embedded into the object either permanently or removably. They can be placed in pockets, straps, slits, hems, seams, between layers of components of the objects, etc. They can be placed within the padding or straps of bags such as backpacks, computer bags, messenger bags, etc. They can be sewn, taped, zipped, laminated etc. into place. The can be used to power warmers and heaters, such as pocket warmers.

The batteries can be in the form of a battery pack containing one or more batteries that can be worn as an arm, wrist, head, leg, ankle, etc. band, a belt, a bandolier, harnesses, etc.

In some embodiments (such as when the batteries are embedded into a suitable waterproof pouch), the gear (such as clothing) containing the batteries can be washed.

Figure 6:
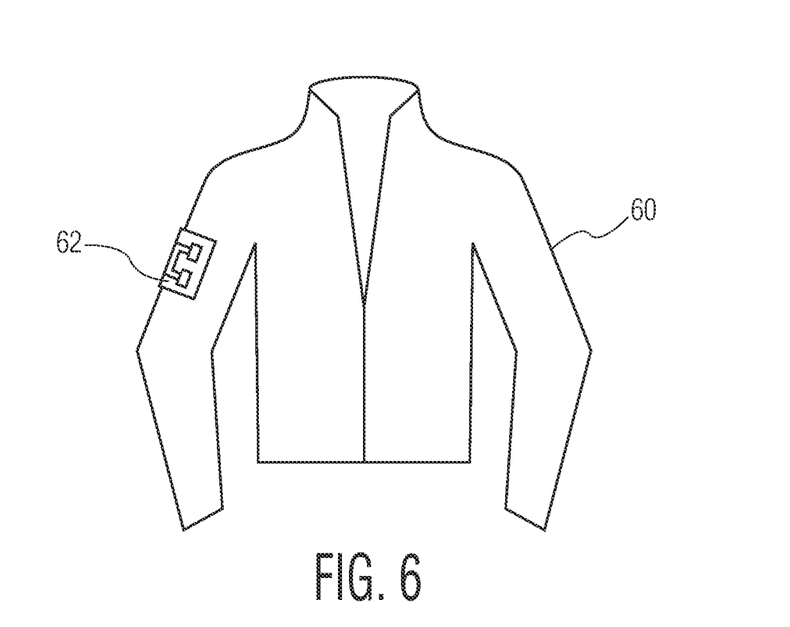
FIG. 6 shows a jacket having a battery of the invention attached to its sleeve.
Figure 7:
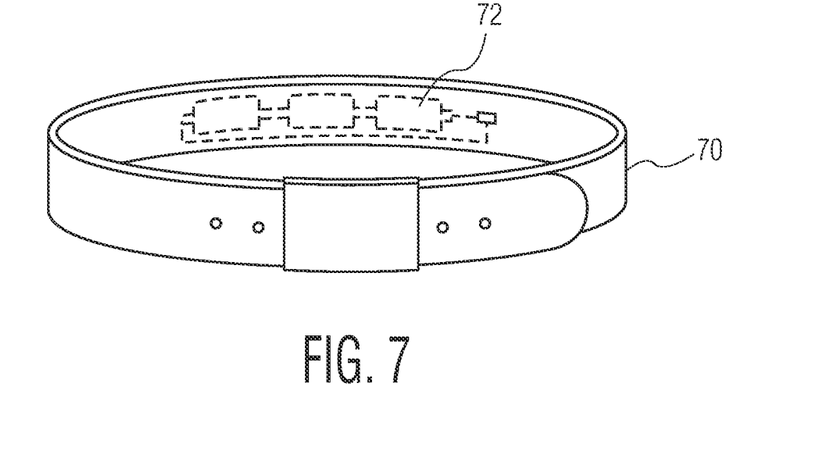
FIG. 7 shows a belt containing a battery of the invention.
Figure 8:
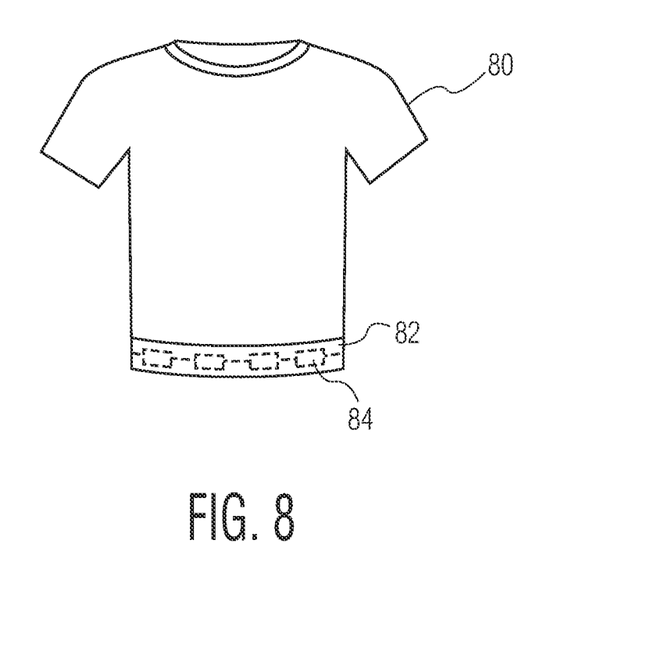
FIG. 8 shows a shirt having a hem containing a battery of the invention.
Figure 9:
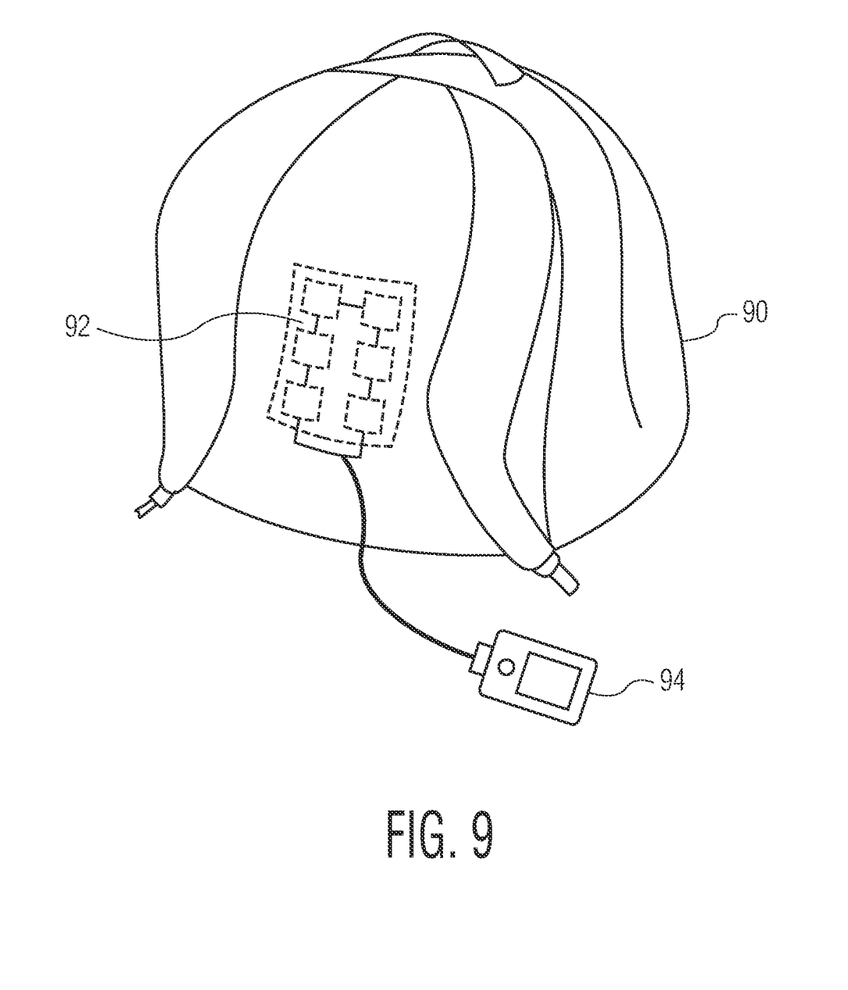
FIG. 9 shows a backpack into which is embedded a battery of the invention.

FIG. 6 shows a jacket 60 having a flexible battery of the invention 62 attached to its sleeve. The batteries can be embedded into other objects. FIG. 7 shows a belt 70 into which a flexible battery 72 has been embedded. FIG. 8 shows a shirt 80 having a hem 82 containing a flexible battery 84. FIG. 9 shows a backpack 90 having a flexible battery 92 embedded into its back. The battery can be connected to a portable electronic device 94 to, for example, charge it.

The batteries can be in the form of a battery pack strap that can be removable or permanently attached to a piece of equipment.

Figure 11A:
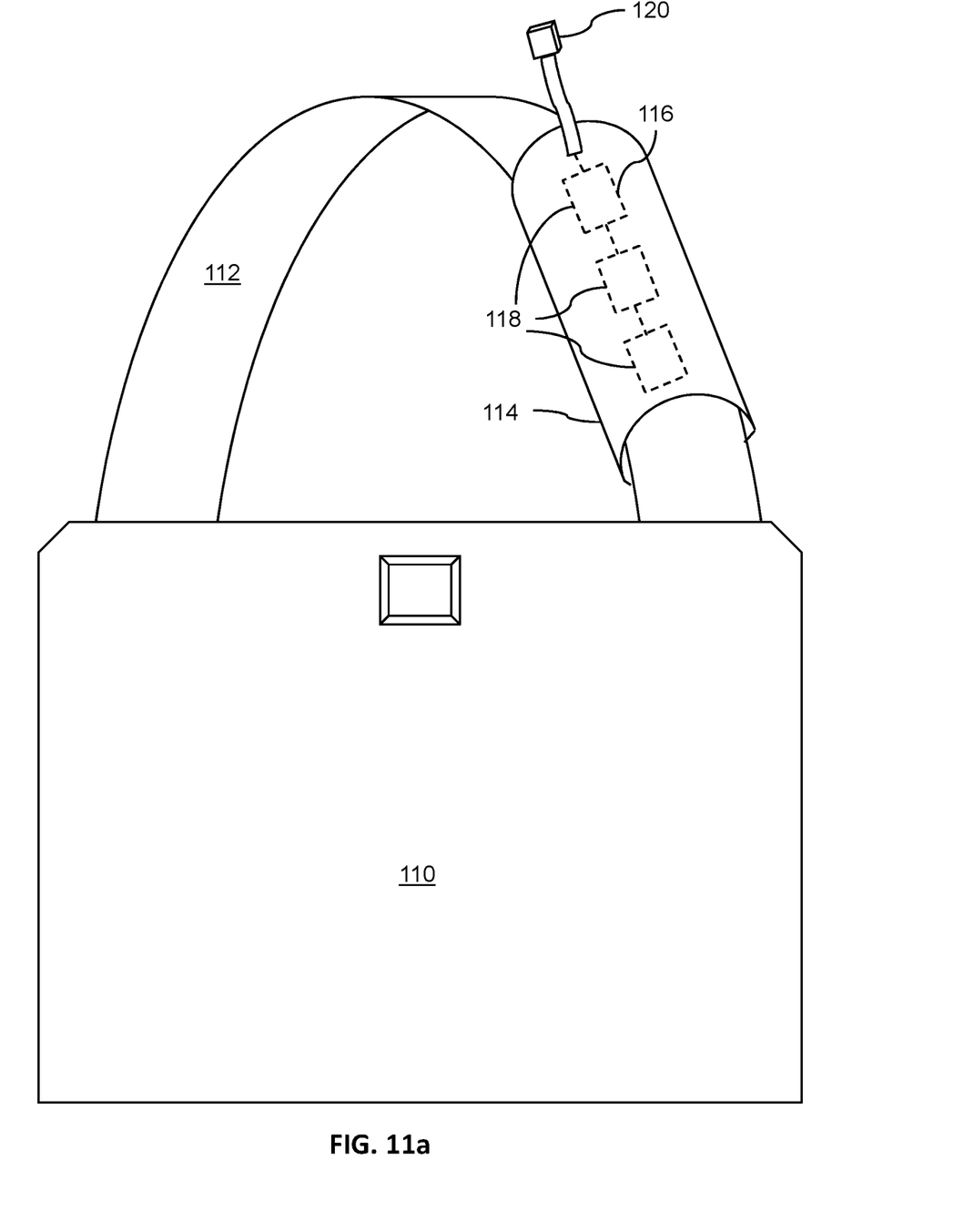
FIG. 11(a) shows a battery pack strap attached to the strap of a bag.

FIG. 11(a) shows a bag 110 having a strap 112. Wrapped around strap 112 is battery pack strap 114, into which is inserted battery 116, which comprises cells 118, and which is connected to connector 120, which emerges from the battery pack strap to be connected to a device to charge or power.

Figure 11B:
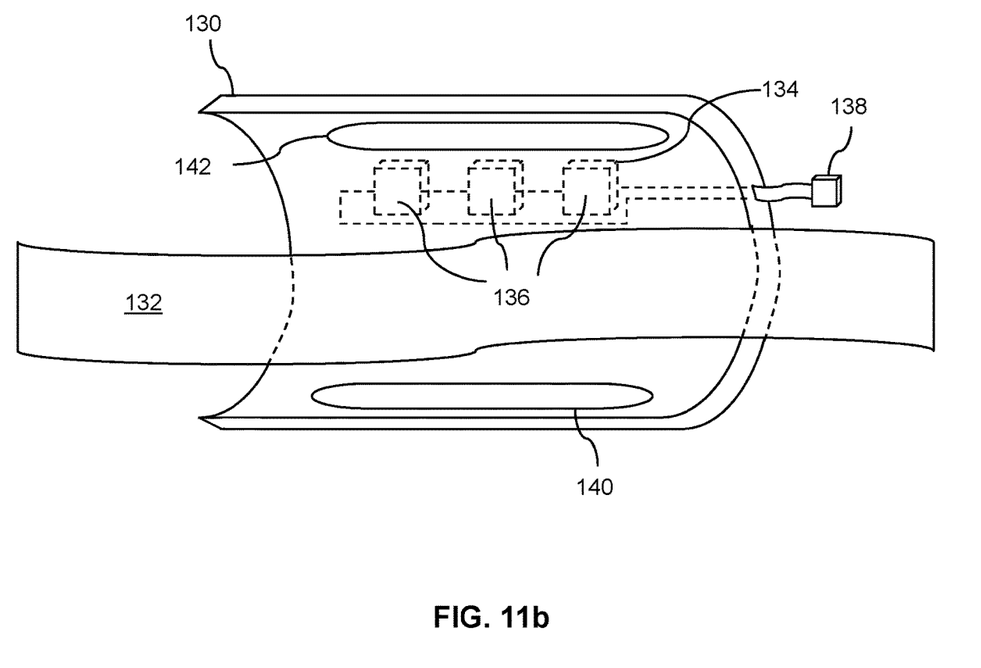
FIG. 11(b) shows a battery pack strap that has been unfastened from the strap of a bag.

FIG. 11(b) shows an open battery pack strap 130 through which is run a bag strap 132. The strap contains battery 134, which comprises cells 136 and which is attached to connector 138 which emerges from the battery pack strap to be connected to a device to charge or power. The battery pack strap can be closed and secured shut by folding it over bag strap 132 and contacting hook and loop (e.g. Velcro®) fastener pieces 140 and 142 to each other.

Battery pack straps can also be used to power wireless charging devices, etc. They can be used on any suitable piece of equipment or clothing, such as bags, purses, messenger bags, suitcases, duffel bags, luggage, backpacks, camera and video equipment straps, harnesses, bandoliers, etc. They can be made of any suitable material, including cloth, fabric, non-woven materials, leather, nylon, polyester, etc. The strap may be fastened in place using any suitable method, such as by zippers, snaps, buttons, tape, adhesive, hook and loop fasteners (e.g. Velcro®), etc.

The batteries can be used to power heaters, coolers, and other thermal management devices, including heaters in apparel, bags, and other gear. The thermal management devices can be built into the gear, or can be modular or otherwise attached to the gear.

The thermal management devices can include, for example, heaters and coolers, medical devices, heating pads, heating patches, heaters and window defrosters for vehicles (such as cars, trucks, motorcycles, forklifts, airplanes, farm equipment), packaging, hot or cold food and beverage packaging, etc.

The thermal management device may be used to heat or cool some portion of the body. Heating or cooling may be desired for a variety of purposes, such as medical treatment, therapy, rehabilitation, comfort, thermal conditioning, biofeedback, etc. The thermal management device may be applied to any part of the body or combination of parts, such as joints, muscles, extremities, head, abdomen, skin, etc.

Examples of types of thermal management devices include medical and health-related devices, portable heaters and coolers, heaters and coolers for food and beverages (such as coffee, carbonated drinks, alcoholic drinks, etc.), chemical curing devices, etc. Examples of medical devices include heating and cooling pads, bandages (such as ace bandages), splints, braces, casts, etc.

The batteries can be used to power or charge electronic devices, such as personal electronic devices, including computers (such as laptop and tablet computers (such as iPads, Kindles, Nooks, etc.)), cellular telephones, games, GPS receivers, personal digital assistants, music players, game players, calculators, artificial "paper" and reading devices, radios, walkie-talkies, pagers, etc. They can be used to power cameras, flash lamps, video cameras, microphones, other recording equipment, etc. The batteries can be used to power sensor and health monitoring (such as blood pressure, heart rate, etc.) devices. They can be used to power wireless chargers. They can be used to power medical alert devices. They can be used to power power tools, emergency equipment, lights, flashlights, chemical detectors, lamps, scientific and forensic apparatus, night vision goggles, etc. They can be used to power equipment carried by military personnel, police, firefighters, first responders, photographers and camera crews, journalists, medical personnel, athletes, adventurers, etc.

The batteries can be embedded in cases and covers for personal electronic devices, such as covers and cases for tablet computers (such as iPads).

Rechargeable batteries can be recharged using external charging devices, other batteries, solar power, AC power, etc.

The batteries can be connected to a device to power using any suitable means, such as a USB, mini-USB, cellular phone charging connectors, iPhone and iPad connectors, cables, plugs, etc. The batteries can be connected to a power inverter to provide AC voltage (e.g. 110/120 and 220/240 volts). Multiple power outlets or jacks can be present. Power connectors can be present in different places in the batteries. For example, if the battery is a long structure, connections can be available at different ends. Connectors can be integrated into the battery assembly and incorporated into a garment or other equipment or gear that contains the batteries.

The batteries may comprise graphene sheets. Graphene sheets may be present in cell electrodes (anodes, cathodes), in inks used to print bus bars, in the flexible connectors, in coating for packaging and wrapping materials, etc.

The graphene sheets are graphite sheets preferably having a surface area of from about 100 to about 2630 $m^2/g$. In some embodiments, the graphene sheets primarily, almost completely, or completely comprise fully exfoliated single sheets of graphite (these are approximately ≤1 nm thick and are often referred to as "graphene"), while in other embodiments, at least a portion of the graphene sheets can comprise partially exfoliated graphite sheets, in which two or more sheets of graphite have not been exfoliated from each other. The graphene sheets can comprise mixtures of fully and partially exfoliated graphite sheets. Graphene sheets are distinct from carbon nanotubes. Graphene sheets can have a "platey" (e.g. two-dimensional) structure and do not have the needle-like form of carbon nanotubes. The two longest dimensions of the graphene sheets can each be at least about 10 times greater, or at least about 50 times greater, or at least about 100 times greater, or at least about 1000 times greater, or at least about 5000 times greater, or at least about 10,000 times greater than the shortest dimension (i.e. thickness) of the sheets.

Graphene sheets are distinct from expanded, exfoliated, vermicular, etc. graphite, which has a layered or stacked structure in which the layers are not separated from each other. The graphene sheets do not need to be entirely made up of carbon, but can have heteroatoms incorporated into the lattice or as part of functional groups attached to the lattice. The lattice need not be a perfect hexagonal lattice and may contain defects (including five- and seven-membered rings).

Graphene sheets can be made using any suitable method. For example, they can be obtained from graphite (including natural, Kish, and synthetic, annealed, pyrolytic, highly oriented pyrolytic, etc. graphites), graphite oxide, expandable graphite, expanded graphite, etc. They may be obtained by the physical exfoliation of graphite, by for example, peeling, grinding, milling, graphene sheets. They made be made by sonication of precursors such as graphite. They may be made by opening carbon nanotubes. They may be made from inorganic precursors, such as silicon carbide. They may be made by chemical vapor deposition (such as by reacting a methane and hydrogen on a metal surface). They may be made by epitaxial growth on substrates such as silicon carbide and metal substrates and by growth from metal-carbon melts. They made by made They may be may by the reduction of an alcohol, such ethanol, with a metal (such as an alkali metal like sodium) and the subsequent pyrolysis of the alkoxide product (such a method is reported in Nature Nanotechnology (2009), 4, 30-33). They may be made from small molecule precursors such as carbon dioxide, alcohols (such as ethanol, methanol, etc.), alkoxides (such as ethoxides, methoxides, etc., including sodium, potassium, and other alkoxides). They may be made by the exfoliation of graphite in dispersions or exfoliation of graphite oxide in dispersions and the subsequently reducing the exfoliated graphite oxide. Graphene sheets may be made by the exfoliation of expandable graphite, followed by intercalation, and ultrasonication or other means of separating the intercalated sheets (see, for example, Nature Nanotechnology (2008), 3, 538-542). They may be made by the intercalation of graphite and the subsequent exfoliation of the product in suspension, thermally, etc. Exfoliation processes may be thermal, and include exfoliation by rapid heating, using microwaves, furnaces, hot baths, etc.

Graphene sheets can be made from graphite oxide (also known as graphitic acid or graphene oxide). Graphite can be treated with oxidizing and/or intercalating agents and exfoliated. Graphite can also be treated with intercalating agents and electrochemically oxidized and exfoliated. Graphene sheets can be formed by ultrasonically exfoliating suspensions of graphite and/or graphite oxide in a liquid (which can contain surfactants and/or intercalants). Exfoliated graphite oxide dispersions or suspensions can be subsequently reduced to graphene sheets. Graphene sheets can also be formed by mechanical treatment (such as grinding or milling) to exfoliate graphite or graphite oxide (which would subsequently be reduced to graphene sheets).

Graphene sheets may be made by the reduction of graphite oxide. Reduction of graphite oxide to graphene may be done by thermal reduction/annealing, chemical reduction, etc. and may be carried out on graphite oxide in a solid form, in a dispersion, etc. Examples of useful chemical reducing agents include, but are not limited to, hydrazines (such as hydrazine (in liquid or vapor forms, N,N-dimethylhydrazine, etc.), sodium borohydride, citric acid, hydroquinone, isocyanates (such as phenyl isocyanate), hydrogen, hydrogen plasma, etc. A dispersion or suspension of exfoliated graphite oxide in a carrier (such as water, organic solvents, or a mixture of solvents) can be made using any suitable method (such as ultrasonication and/or mechanical grinding or milling) and reduced to graphene sheets. Reduction can be solvothermal reduction, in solvents such as water, ethanol, etc. This can for example be done in an autoclave at elevated temperatures (such as those above about 200° C.).

Graphite oxide can be produced by any method known in the art, such as by a process that involves oxidation of graphite using one or more chemical oxidizing agents and, optionally, intercalating agents such as sulfuric acid. Examples of oxidizing agents include nitric acid, nitrates (such as sodium and potassium nitrates), perchlorates, potassium chlorate, sodium chlorate, chromic acid, potassium chromate, sodium chromate, potassium dichromate, sodium dichromate, hydrogen peroxide, sodium and potassium permanganates, phosphoric acid ($H_3PO_4$), phosphorus pentoxide, bisulfites, etc. Preferred oxidants include $KClO_4$; $HNO_3$ and $KClO_3$; $KMnO_4$ and/or $NaMnO_4$; $KMnO_4$ and $NaNO_3$; $K_2S_2O_8$ and $P_2O_5$ and $KMnO_4$; $KMnO_4$ and $HNO_3$; and $HNO_3$. Preferred intercalation agents include sulfuric acid. Graphite can also be treated with intercalating agents and electrochemically oxidized. Examples of methods of making graphite oxide include those described by Staudenmaier (Ber. Stsch. Chem. Ges. (1898), 31, 1481) and Hummers (J. Am. Chem. Soc. (1958), 80, 1339).

One example of a method for the preparation of graphene sheets is to oxidize graphite to graphite oxide, which is then thermally exfoliated to form graphene sheets (also known as thermally exfoliated graphite oxide), as described in US 2007/0092432, the disclosure of which is hereby incorporated herein by reference. The thusly formed graphene sheets can display little or no signature corresponding to graphite or graphite oxide in their X-ray diffraction pattern.

The thermal exfoliation can be carried out in a continuous, semi-continuous batch, etc. process.

Heating can be done in a batch process or a continuous process and can be done under a variety of atmospheres, including inert and reducing atmospheres (such as nitrogen, argon, and/or hydrogen atmospheres). Heating times can range from under a few seconds or several hours or more, depending on the temperatures used and the characteristics desired in the final thermally exfoliated graphite oxide. Heating can be done in any appropriate vessel, such as a fused silica, mineral, metal, carbon (such as graphite), ceramic, etc. vessel. Heating can be done using a flash lamp or with microwaves. During heating, the graphite oxide can be contained in an essentially constant location in single batch reaction vessel, or can be transported through one or more vessels during the reaction in a continuous or batch mode. Heating can be done using any suitable means, including the use of furnaces and infrared heaters.

Examples of temperatures at which the thermal exfoliation and/or reduction of graphite oxide can be carried out are at least about 150° C., at least about 200° C., at least about 300° C., at least about 400° C., at least about 450° C., at least about 500° C., at least about 600° C., at least about 700° C., at least about 750° C., at least about 800° C., at least about 850° C., at least about 900° C., at least about 950° C., at least about 1000° C., at least about 1100° C., at least about 1500° C., at least about 2000° C., and at least about 2500° C. Preferred ranges include between about 750 about and 3000° C., between about 850 and 2500° C., between about 950 and about 2500° C., between about 950 and about 1500° C., between about 750 about and 3100° C., between about 850 and 2500° C., or between about 950 and about 2500° C.

The time of heating can range from less than a second to many minutes. For example, the time of heating can be less than about 0.5 seconds, less than about 1 second, less than about 5 seconds, less than about 10 seconds, less than about 20 seconds, less than about 30 seconds, or less than about 1 min. The time of heating can be at least about 1 minute, at least about 2 minutes, at least about 5 minutes, at least about 15 minutes, at least about 30 minutes, at least about 45 minutes, at least about 60 minutes, at least about 90 minutes, at least about 120 minutes, at least about 150 minutes, at least about 240 minutes, from about 0.01 seconds to about 240 minutes, from about 0.5 seconds to about 240 minutes, from about 1 second to about 240 minutes, from about 1 minute to about 240 minutes, from about 0.01 seconds to about 60 minutes, from about 0.5 seconds to about 60 minutes, from about 1 second to about 60 minutes, from about 1 minute to about 60 minutes, from about 0.01 seconds to about 10 minutes, from about 0.5 seconds to about 10 minutes, from about 1 second to about 10 minutes, from about 1 minute to about 10 minutes, from about 0.01 seconds to about 1 minute, from about 0.5 seconds to about 1 minute, from about 1 second to about 1 minute, no more than about 600 minutes, no more than about 450 minutes, no more than about 300 minutes, no more than about 180 minutes, no more than about 120 minutes, no more than about 90 minutes, no more than about 60 minutes, no more than about 30 minutes, no more than about 15 minutes, no more than about 10 minutes, no more than about 5 minutes, no more than about 1 minute, no more than about 30 seconds, no more than about 10 seconds, or no more than about 1 second. During the course of heating, the temperature can vary.

Examples of the rate of heating include at least about 120° C./min, at least about 200° C./min, at least about 300° C./min, at least about 400° C./min, at least about 600° C./min, at least about 800° C./min, at least about 1000° C./min, at least about 1200° C./min, at least about 1500° C./min, at least about 1800° C./min, and at least about 2000° C./min.

Graphene sheets can be annealed or reduced to graphene sheets having higher carbon to oxygen ratios by heating under reducing atmospheric conditions (e.g., in systems purged with inert gases or hydrogen). Reduction/annealing temperatures are preferably at least about 300° C., or at least about 350° C., or at least about 400° C., or at least about 500° C., or at least about 600° C., or at least about 750° C., or at least about 850° C., or at least about 950° C., or at least about 1000° C. The temperature used can be, for example, between about 750 about and 3000° C., or between about 850 and 2500° C., or between about 950 and about 2500° C.

The time of heating can be for example, at least about 1 second, or at least about 10 second, or at least about 1 minute, or at least about 2 minutes, or at least about 5 minutes. In some embodiments, the heating time will be at least about 15 minutes, or about 30 minutes, or about 45 minutes, or about 60 minutes, or about 90 minutes, or about 120 minutes, or about 150 minutes. During the course of annealing/reduction, the temperature can vary within these ranges.

The heating can be done under a variety of conditions, including in an inert atmosphere (such as argon or nitrogen) or a reducing atmosphere, such as hydrogen (including hydrogen diluted in an inert gas such as argon or nitrogen), or under vacuum. The heating can be done in any appropriate vessel, such as a fused silica or a mineral or ceramic vessel or a metal vessel. The materials being heated including any starting materials and any products or intermediates) can be contained in an essentially constant location in single batch reaction vessel, or can be transported through one or more vessels during the reaction in a continuous or batch reaction. Heating can be done using any suitable means, including the use of furnaces and infrared heaters.

The graphene sheets preferably have a surface area of at least about 100 m$^2$/g to, or of at least about 200 m$^2$/g, or of at least about 300 m$^2$/g, or of least about 350 m$^2$/g, or of least about 400 m$^2$/g, or of least about 500 m$^2$/g, or of least about 600 m$^2$/g., or of least about 700 m$^2$/g, or of least about 800 m$^2$/g, or of least about 900 m$^2$/g, or of least about 700 m$^2$/g. The surface area can be about 400 to about 1100 m$^2$/g. The theoretical maximum surface area can be calculated to be 2630 m$^2$/g. The surface area includes all values and subvalues therebetween, especially including 400, 500, 600, 700, 800, 900, 1000, 1100, 1200, 1300, 1400, 1500, 1600, 1700, 1800, 1900, 2000, 2100, 2200, 2300, 2400, 2500, and 2630 m$^2$/g.

The graphene sheets can have number average aspect ratios of about 100 to about 100,000, or of about 100 to about 50,000, or of about 100 to about 25,000, or of about 100 to about 10,000 (where "aspect ratio" is defined as the ratio of the longest dimension of the sheet to the shortest).

Surface area can be measured using either the nitrogen adsorption/BET method at 77 K or a methylene blue (MB) dye method in liquid solution.

The dye method is carried out as follows: A known amount of graphene sheets is added to a flask. At least 1.5 g of MB are then added to the flask per gram of graphene sheets. Ethanol is added to the flask and the mixture is ultrasonicated for about fifteen minutes. The ethanol is then evaporated and a known quantity of water is added to the flask to re-dissolve the free MB. The undissolved material is allowed to settle, preferably by centrifuging the sample. The concentration of MB in solution is determined using a UV-vis spectrophotometer by measuring the absorption at $\lambda_{max}$=298 nm relative to that of standard concentrations.

The difference between the amount of MB that was initially added and the amount present in solution as determined by UV-vis spectrophotometry is assumed to be the amount of MB that has been adsorbed onto the surface of the graphene sheets. The surface area of the graphene sheets are then calculated using a value of 2.54 m$^2$ of surface covered per one mg of MB adsorbed.

The graphene sheets can have a bulk density of from about 0.01 to at least about 200 kg/m$^3$. The bulk density includes all values and subvalues therebetween, especially including 0.05, 0.1, 0.5, 1, 5, 10, 15, 20, 25, 30, 35, 50, 75, 100, 125, 150, and 175 kg/m$^3$.

Graphene sheets can be used in a dry or powder form (with little or no solvent), as a blend/dispersion/etc. in one or more solvents.

The graphene sheets can be functionalized with, for example, oxygen-containing functional groups (including, for example, hydroxyl, carboxyl, and epoxy groups) and typically have an overall carbon to oxygen molar ratio (C/O ratio), as determined by bulk elemental analysis, of at least about 1:1, or more preferably, at least about 3:2.

Examples of carbon to oxygen ratios include about 3:2 to about 85:15; about 3:2 to about 20:1; about 3:2 to about 30:1; about 3:2 to about 40:1; about 3:2 to about 60:1; about 3:2 to about 80:1; about 3:2 to about 100:1; about 3:2 to about 200:1; about 3:2 to about 500:1; about 3:2 to about 1000:1; about 3:2 to greater than 1000:1; about 10:1 to about 30:1; about 80:1 to about 100:1; about 20:1 to about 100:1; about 20:1 to about 500:1; about 20:1 to about 1000:1; about 50:1 to about 300:1; about 50:1 to about 500:1; and about 50:1 to about 1000:1. In some embodiments, the carbon to oxygen ratio is at least about 10:1, or at least about 15:1, or at least about 20:1, or at least about 35:1, or at least about 50:1, or at least about 75:1, or at least about 100:1, or at least about 200:1, or at least about 300:1, or at least about 400:1, or at least 500:1, or at least about 750:1, or at least about 1000:1; or at least about 1500:1, or at least about 2000:1. The carbon to oxygen ratio also includes all values and subvalues between these ranges.

The graphene sheets can contain atomic scale kinks. These kinks can be caused by the presence of lattice defects in, or by chemical functionalization of the two-dimensional hexagonal lattice structure of the graphite basal plane.

The invention claimed is:

1. A battery, comprising:
   at least two cells;
   wherein
   at least two cells are connected by flexible connectors, such that the battery can be bent; and
   the flexible connectors comprise graphene sheets.

2. The battery of claim 1, wherein the cells are pouch cells.

3. The battery of claim 1, wherein the battery is washable.

4. The battery of claim 1, wherein the cells have a surface-to-volume ratio of at least about 4:1.

5. The battery of claim 1, wherein the cells have a maximum thickness of about 1 cm.

6. The battery of claim 1, wherein the cells are sealed in a waterproof pouch.

7. The battery of claim 1, wherein the cells have an electrode comprising the graphene sheets.

8. The battery of claim 1, wherein the battery is a lithium ion battery.

9. The battery of claim 1, wherein the battery is rechargeable.

10. The battery of claim 1, wherein the battery is connected to a portable electronic device.

11. The battery of claim 1, wherein the battery is connected to a heater.

12. An article of clothing or equipment comprising the battery of claim 1.

13. The article of clothing or equipment of claim 12, in the form of a belt.

14. The article of clothing or equipment of claim 12, in the form of a bulletproof vest.

15. The article of clothing or equipment of claim 12, in the form of a harness.

16. The article of clothing or equipment of claim 12, in the form of a bandolier.

17. A bag comprising the battery of claim 1.

18. A battery pack strap comprising the battery of claim 1.

\* \* \* \* \*